United States Patent [19]

Lushtak et al.

[11] Patent Number: 4,503,491
[45] Date of Patent: Mar. 5, 1985

[54] COMPUTER WITH EXPANDED ADDRESSING CAPABILITY

[75] Inventors: Alexander S. Lushtak, San Francisco; John S. Forker, Los Altos, both of Calif.

[73] Assignee: Matsushita Electric Industrial Co., Ltd., Osaka, Japan

[21] Appl. No.: 278,840

[22] Filed: Jun. 29, 1981

[51] Int. Cl.³ .................. G06F 9/00; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,803,554 | 4/1974 | Bock et al. | |
| 3,821,715 | 6/1974 | Hoff, Jr. et al. | 364/200 |
| 3,866,176 | 2/1975 | Baitinger et al. | 340/825.87 |
| 4,025,903 | 5/1977 | Kaufman et al. | 364/200 |
| 4,050,096 | 9/1977 | Bennett et al. | 364/200 |
| 4,148,099 | 4/1979 | Lauffer et al. | 365/226 |
| 4,151,611 | 4/1979 | Sugawara et al. | 365/227 |
| 4,281,392 | 7/1981 | Grants et al. | 364/900 |
| 4,368,515 | 1/1983 | Nielsen | 364/200 |
| 4,443,865 | 4/1984 | Schultz et al. | 364/900 |
| 4,446,341 | 5/1984 | Rubin | 179/172.2 R |

OTHER PUBLICATIONS

A. Blum et al., *Fast Multichip Memory System with Power Select Signal*, IBM Technical Disclosure Bulletin, vol. 22, No. 3, (Aug. 1979), pp. 1057-1058.

*Primary Examiner*—Raulfe B. Zache
*Assistant Examiner*—A. E. Williams, Jr.

[57] ABSTRACT

A computer system has an addressing capability many times greater than the number of address which can be generated by its binary address lines through the use of a plurality of addressable banks (14, 16, 18, 22, 30, 34) (memory, addressable peripherals or addressable system controls) in each of a plurality of different ranges, (II, III, IV) with several different banks in each of said plural address ranges being useable in combination for any given mode of operation or program. Bank selection within an address range is effected within program control by first supplying (1) an address which enables a bank select decoding latch (28), and (2) a data code for selecting the desired bank, whereupon the bank will be latched and enabled for use in a later normal addressing operation. ROM banks (14, 16, 18), implemented in monolithic circuit form, are selected by decoder latch outputs (D2, D1, D0) which cause the bank (40) to be energized from a non-energized state, thereby eliminating (1) the need for a separate chip-select terminal, and (2) standby power consumption. Addressable peripheral equipment and system controls (30, 34) (non-ROM hardware) are mapped in an address range (III) containing ROM banks. Writing to this address range automatically goes to the non-ROM hardware since the ROM banks are incapable of receiving data. Reading from the non-ROM hardware is effected by preselecting non-ROM hardware through the use of specific data codes.

1 Claim, 4 Drawing Figures

Memory Map

ROM Chip With Power-On Select

RAM Bank Select Latches

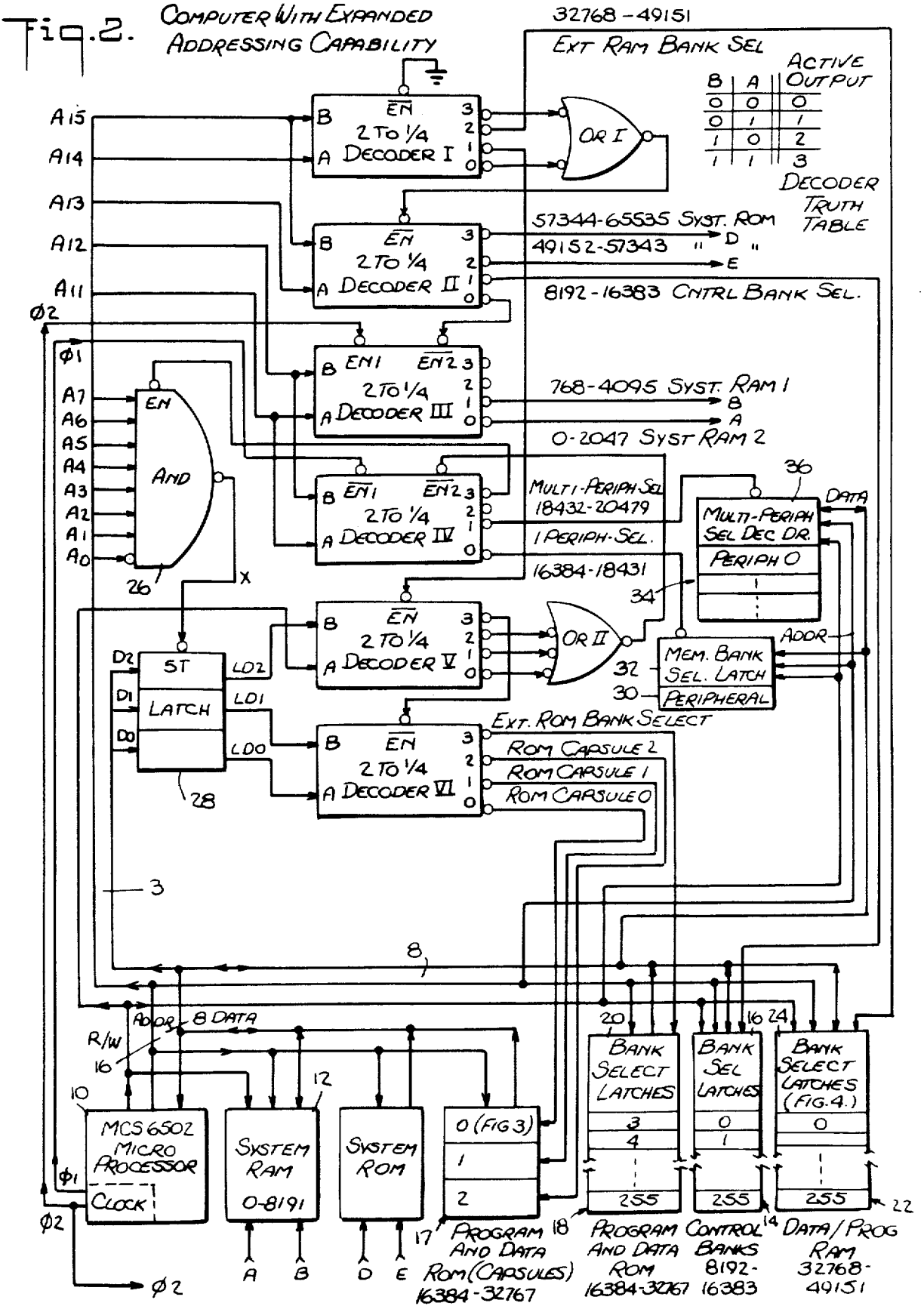

COMPUTER WITH EXPANDED ADDRESSING CAPABILITY

BACKGROUND

1. Field of Invention

This invention relates to a computer, particularly to a computer having an expanded addressing capability.

2. Description of Prior Art

Digital computers generally have a limited addressing capability, i.e. the capability to generate, write information to, and read information from, only up to a given number of memory addresses or locations. For example, in a computer operating on a binary radix (i.e. a radix of two), and having sixteen address lines, the computer can generate up to 65536 addresses on its address lines; these addresses can have any value from 0 to 65535. Each address may be a location in a memory or an input-output (I/O) port which connects the computer to addressable peripheral equipment, such as a keyboard, a printer, or a video display terminal. Each memory location usually consists of eight binary cells which can store a byte (information word) consisting of eight bits (ONES and ZEROES) of binary information, and each I/O address can pass eight-bit bytes to and from the computer.

While the capability of addressing 65536 locations, which can contain 65536×8=524,288 binary cells, may seem like a relatively large capacity, in actuality this amount of storage capability is considered relatively limited, even for a small computer, and severly limits the program and data handling and storage capability of the computer and the number of items of peripheral equipment which can be connected to the computer.

It is possible to increase the addressing capability of computer by providing additional address lines and making corresponding expansions in its program counter, instruction register, decoder, etc. However, it is difficult to do so since most small computers are now formed within a monolithic integrated circuit (usually termed a microprocessor) and the number of leads or output terminals of the microprocessor or "chip" are limited by package size. Also, many microprocessors have become standardized for mass production and therefore have relatively low cost, so that increasing addressing capability requires redesign and commercial implementation of new and non-standard microprocessors at extremely great expense. Therefore it would be desirable to provide a means for expanding the addressing capability of a computer without increasing the number of its address lines or making other concomitant changes therein.

Heretofore, one method of increasing the address capability has been to provide a memory bank switching capability in which, in a given address range, two different banks of memory are provided. Either bank was selectable in a separate bank-select cycle prior to the regular fetch/execute cycle. While the use of the bank selection or bank switching concept has been able to expand the addressing capability of a computer beyond its stated capacity, the degree of expansion possible was extremely limited and merely increased memory capacity slightly, such that a slightly longer program or some additional data could be stored. Most of the aforementioned limitations were still extant and the peripheral equipment capacity of the computer was not increased.

In prior bank switching or bank selection techniques, a non-selected memory bank was enabled or switched into an address range by supplying an enabling signal to latch in the memory bank prior to the normal memory read or write operation. Most banks of read-only memories (ROMs) were provided in form of a monolithic integrated circuit (IC) or chip which was packaged in a standard or custom integrated circuit package having a plurality of terminals or leads, one of which was the "chip select" or "chip enable" terminal. When this terminal was supplied with an active signal, the chip was "selected" so that it would supply output data in response to an address input.

This method of chip selection was disadvantageous in that it required a separate terminal on the IC where, as stated, the number of available terminals was limited due to size configurations. Also, the IC consumed power whether it was selected or not. While such power consumption was not excessive, any power consumption, especially for unused circuitry, is wasteful and is especially undesirable in portable devices which are operated from an energy cell where the energy supply capability is relatively limited.

SUMMARY OF THE INVENTION

Accordingly, several objects of the invention are to expand the addressing capability of a computer, to expand the peripheral equipment handling capability of a computer, to provide a computer which can employ more-economical, less-complicated, and much more efficient memory banks, to provide a computer which is extremely versatile in handling and addressing many areas of memory on peripheral equipment, and to provide such a computer with simpler, more economical, and more efficient ROM chips.

Particularly, the present invention has as its principal object provision of a computer which is capable of expanding the program and data handling and storage capability and the number of items of peripheral equipment without increasing the number of address lines or making other concomitant changes therein.

The computer includes processor means which has an address bus with a plurality of address lines for generating and supplying addresses through the address bus, a plurality of addressable banks which are divided into a plurality of distinct address ranges, and bank preselection means for preselecting any bank of any address range such that, if any address within the range is substantially supplied on the address bus, it will be effective only at the preselected bank of such range and all other non-preselected banks will be inactive and not addressed by the processor means. Further, each addressable bank is implemented in the form of at least one monolithic integrated circuit having first and second bias supply terminals. The first bias supply terminal is designed to be connected to a reference potential and the second bias supply terminal is designd to be connected to a biasing potential. The bank preselection means is arranged to cause the second bias supply terminal to be connected to the biasing potential when the bank is selected and to be connected to the reference potential when the bank is not selected. Further objects and advantages will become apparent from a consideration of the ensuing description thereof.

BRIEF DESCRIPTION OF THE DRAWING

FIG. 2 is a block diagram of a computer system with an expanded addressing capability according to the invention.

DESCRIPTION OF THE PREFERRED EMBODIMENTS

FIG. 1—MEMORY MAP

Figure 1:
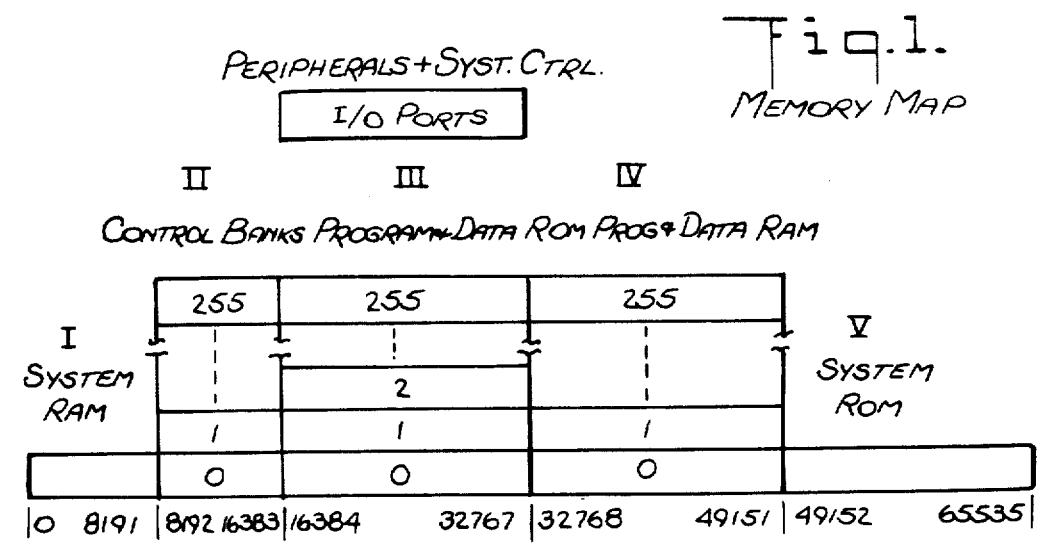
FIG. 1 is a memory map for a computer system in accordance with the invention.

FIG. 1 is a map of the memory banks and addressable peripherals of a computer in accordance with the invention. As indicated at the bottom of the figure, the computer can generate addresses in a spectrum from 0 to 65535 (decimal or radix 10 designation). Many users designate memory addresses in hexadecimal form (radix 16), in which case the first and last addresses would be 0000 and FFFF. However addresses will be designated herein in a decimal radix.

The memory spectrum shown in FIG. 1 is divided in five address ranges designated from Address Range I to Address Range V, as follows:

Address Range I includes the 8192 addresses from 0 to 8191 and is used for system RAM (Read And write Memory—often referred to as random access memory), i.e., the temporary storage of variable data and programs which are worked with and manipulated by the computer. Each address comprises a location which can store one byte (eight bits) of binary data. The RAM usually is provided in the form of several integrated circuit chips which are indicated by the rectangular box. The box is heavyily outlined to indicate that the system RAM is located within the housing of the computer.

Address Range II includes the 8192 addresses from 8192 to 16383. Range II contains Control ROM, i.e. Read Only Memory or firmware which is programmed to control the communication between various items of peripheral equipment (e.g., keyboards, video display terminals, modems, printers, etc.) and the computer. The Control ROM Is an expanded memory, i.e. instead of one block or bank of memory, up to 256 individual ROM banks, numbered from 0 to 255 as indicated, are provided. Any one of these banks'may be made active, such that addresses generated by the computer within Range II will be effective at the active or enabled bank only and all other banks will be inactive and not addressable by the computer. Each of the 256 banks contains its own 8192 locations, so that Range II can have up to 2,097,152 locations. Although the computer can select any of 256 banks as indicated, only several banks were actually implemented in one presently-commercialized portable or hand-held computer, with provision being made so that additional banks could be connected as and if the need arose. The Control ROM banks were also provided in the form of integrated circuits, and these were physically outside the computer housing (indicated by their all being drawn in relatively light rectangles) and within peripheral devices, connected to the computer's busses.

Address Range III covers the 16384 addresses from 16384 to 32767. Two types of addressable hardware are provided in Range III: (1) Program and Data ROM for storing fixed data and programs for various applications or tasks which may be performed by the computer, and (2) I/O Ports for communication with peripherals and system control hardware. Typical peripherals are a printer, a video display adapter, and a modem; typical system control hardware items are a built-in keyboard, liquid crystal display, a low battery sensor, an internal timer, a beeper, etc. The Program and Data ROM is provided in the form of up to 256 banks numbered from 0 to 255 as indicated, and the peripherals and system control hardware are provided as a separate addressable bank, as will be described later. The first three Program and Data ROM banks, as indicated by their heavy outlining (Banks 0, 1, and 2), are provided within the main computer housing and are actually provided in the form of "capsules" or integrated circuits which can be plugged into three respective receptacle recesses in the bottom of the computer. These capsules hold fixed data or programs, such as a word-processing program, an appointment calendar program, a salesman's data log and computation program, etc. As with the banks in Range II, any of the Program and Data ROM banks physically internal or external to the computer housing in Range III can be selected to be responsive to addresses generated by the computer. Thus Range III can have up to 256×6,384−4,194,304 locations.

Address Range IV covers the 16384 addresses from 32768 to 49151 and comprises banks of RAM which are numbered from 0 to 255, as indicated. These RAM banks hold variable information for use by the system, such as commercially-sold programs which can be loaded into one or more banks, variable data files which can be stored and manipulated by the computer, such as prose in a word-processing application, accounting figures, etc. The number of locations in, or bytes storable by, each RAM Bank is 16,384, but files longer than this figure can be stored in several adjacent banks. As with Ranges II and III, any bank in Address Range IV can be selected to be responsive to addresses generated within this range by the computer. The RAM Banks are external to the computer housing, as indicated by the absence of heavy outlining.

Lastly, the highest range of addresses, Range V, from address 49152 to address 65535 (16384 addresses), is provided for System ROM, i.e., programmed memory or firmware which controls the internal operation of the computer. As indicated by the heavy outline, the System ROM is located within the computer housing and only one bank is provided, so that no bank selection or switching is possible in Range V.

Through the use of plural address ranges, each having plural banks of memory or peripheral equipment which can be selected, the addressing capability of the computer is multiplied many times beyond its nominal range of 65536 addresses and its versatility is greatly enhanced. For example, the computer can use several banks in several different address areas in any combination to perform tasks, such as working with a peripheral controlled by a ROM in Range II using an application program in Range III and working with data in a RAM in Range IV. Also, the computer can work with many peripherals having their I/O ports in Range III, each controlled by a different ROM in Range II.

FIG. 2—DESCRIPTION OF COMPUTER SYSTEM WITH EXPANDED ADDRESSING CAPABILITY

A computer system in accordance with the invention is shown in block diagram form in FIG. 2. All standard or conventional components are shown without detail, while circuitry relative to the invention is shown in more detail and details of certain areas of particular interest are expanded in FIGS. 3 and 4.

At the heart of the system is a one-chip Microprocessor 10, type designation MCS6502, and manufactured by Synertek, Mostek, or Rockwell. Details of the 6502 microprocessor are given in various publications, such as the Synertek Hardware Manual, published by Synertek, 3050 Coronado Drive, Santa Clara, CA 95051. Briefly, the 6502 is a forty-pin device which contains an internal oscillator and clock drivers, a sixteen-bit address bus an eight-bit bidirectional data bus, two interrupts, a read/write (R/W) line, a two-phase clock (outputs on lines Phi 1 and Phi 2), other control terminals, and bias voltage terminals. Clock line Phi 2 is the logical inversion of clock line Phi 1.

As indicated by the five output lines shown, only the read/write, address, data, and clock output terminals of microprocessor 10 will be discussed. The address output bus contains sixteen conductors or lines, as indicated, and the data bus contains eight lines, but each of these busses is shown as a single heavy line for facilitation of illustration. During the first half of the memory cycle, when clock line Phi 1 is high or active, the address and read/write signals are supplied, and when clock line Phi 2 is high, data transfer takes place.

The System RAM (Address Range I of FIG. 1) is shown at 12 and receives read/write, address, and data inputs, and supplies a data output, as indicated by the two arrows on the data line. Also, RAM 12 receives two further address sub-range select signals A and B, as indicated; these leads come from the outputs of Decoder III elsewhere in the diagram and are not joined to their inputs of RAM 12 for purposes of facilitation of illustration.

The Control Banks in Address Range II of FIG. 1 are shown at 14 in FIG. 2 and, as indicated in both figures, consist of 256 banks designated 0 to 255. The Control Banks have bank selection Latches 16. Banks 14 contain ROM (for peripheral control software) and some banks also contain RAM (for peripheral buffers and variable data). Banks 14 receive address and read/write inputs and supply data output. Also, Banks 14 receive a control bank select input from Decoder II elsewhere in FIG. 2. When one of Banks 14 is preselected as discussed below, it can be read from and written to by Microprocessor 10 when the control bank select input from Decoder II goes active and an address and a read signal are supplied thereto.

Address Range III, contains program and data ROM banks which are implemented in two areas of FIG. 2. Application Capsules 0 to 2, which can be plugged into recesses in the computer housing, are shown at 17 and the rest of the ROM banks (3 to 255) are shown at 18. Each ROM Bank or Capsule 0 to 2 receives an address input, supplies a data output, and is enabled by a separate ROM capsule select input from a Decoder VI in FIG. 2. The rest of the ROM banks, 3 to 255, are provided in a housing separate from the computer and have their own bank select Latches 20 which are connected to the address, data, and read/write lines, and are also connected to an external ROM bank select line from Decoder VI.

Also, in Range III, the I/O ports are provided. The computer has a plug (not shown) onto which either a single item of Peripheral Equipment 30 (such as a printer), or a bus expander (not shown) can be connected, whereafter up to five items of Peripheral Equipment 34 (such as a printer, a RAM, a serial communications interface (industry designation RS232), a TV-driver adapter, or a modem) can be plugged into five slots on the bus expander. When Single Peripheral 30 is connected to the computer, its I/O ports are addressed in an address range from 16384 to 18431. The peripheral is also connected to the address, data, and read/write lines, in addition to a single peripheral select line from Decoder IV. When the bus expander is connected to the computer, it and its Peripherals 34 are addressed in an address range from 18432 to 20479 and inputs are supplied by a multi-peripheral select line from Decoder IV and the usual address, data, and read/write lines. Peripheral 30 is enabled by selecting one of its memory banks through Latch 32. Communication with multiple Peripherals 34 is done via the multi-peripheral I/O adapter or bus expander (not shown), which contains a multi-peripheral Decoder 36. (The system control hardware, also addressed in Range III, is not indicated.)

In Address Range IV, the RAM Banks are shown at 22 and are similar to ROM Banks 18 in operation in that they have their own bank select Latches 24 which are connected to the address, data, and read/write lines, and an external RAM bank select line from Decoder I.

In Address Range V, the System ROM is shown at 27. ROM 27 is provided within the computer housing, receives address inputs, provides a data output, and also receives two further address sub-range select inputs D and E which come from a Decoder II elsewhere in the diagram.

In addition to Microprocessor 10, Memories 12, 14, 17, 18, 22, and 27, and Peripherals 30 and 34, the system of the invention also contains address range decoders, and memory bank select latches; these comprise the rest of the components in FIG. 2 as follows:

An AND Gate 26 receives eight address inputs (A0 to A7) from the address bus and also receives an enabling (EN) input from output 3 of Decoder IV. AND gate 26 supplies an output when all of its inputs are ONES and its enabling input terminal is active. Its input from address line A0 is inverted, as indicated by the small circle between the AND gate and the A0 address line. Its output line (designated X) goes to the strobe (ST) input terminal of a Latch 28.

The three least-significant Data Lines, D2, D1, and D0, of the data bus from Microprocessor 10 go to a three-bit Latch 28 which receives logic values (ONES OR ZEROES) at its three data input terminals, D2, D1, D0, and supplies and holds these logic values at its three corresponding data output terminals, LD2, LD1, and LD0, when latched by an input to its strobe terminal from the output line (X) of AND Gate 26. For example, if the data word 101 should be supplied to input terminals D2, D1, and D0, respectively, of Latch 28 while its strobe terminal receives an active input, output terminals LD2, LD1, and LD0 will supply and hold the same data word, 101, even after inputs D2, D1, and D0 change. To change the outputs of Latch 28, a new strobe input and a new set of data inputs must be supplied thereto.

Many of the inputs and outputs of the logic components in the diagram of FIG. 2 are inverted, but the inverters and the individual inversion functions will not be detailed since the locations and functions of all inverters will be readily apparent from the circle symbols provided.

The system also contains six Decoders, designated from I to VI. Each Decoder has two logic input terminals, B and A, and four logic output terminals, 0, 1, 2, and 3. Decoders I, II, V, and VI have one enabling input terminals, while Decoders III and IV each have two enabling input terminals. When a Decoder is enabled by applying an active signal to its enabling input terminal(s), one of its four output terminals will be active, depending on the state of its two input terminals, in accordance with the Decoder Truth Table shown in FIG. 2. For example, if input terminals B and A of Decoder III are both logical ONES, and both enabling input terminals receive active inputs, output terminal 3 will be active, as indicated in the bottom row of the Truth Table.

The connections between the Decoders and the address lines will not all be detailed since they are readily apparent. Note that Address Lines A11 to A15 are connected to Decoders I to IV, the three outputs of Latch 28 are supplied to Decoders V and VI, the read/write signal is supplied to the A input terminal of Decoder V, clock signals Phi 1 and Phi 2 are supplied to the enabling input terminals of Decoders III and IV, the output terminals of certain Decoders are supplied to the enabling input terminals of other Decoders and to the input terminals of two OR Gates I and II, output terminal 3 of Decoder IV is supplied to the enabling input terminal of AND Gate 26, output terminals 0 and 1 of Decoder IV go to the I/O port (Latches 32 and 36) and the other Decoder output terminals are supplied to the selection latches of the addressable memories.

OR Gates I and II have two and three input terminals, respectively. The output terminal of OR Gate I is supplied to the enabling input terminal of Decoder II and the output terminal of OR Gate II is supplied to enabling input terminal 2 of Decoder IV. Each OR Gate supplies an output if either one or more of its inputs are active.

FIG. 2—OPERATION

The system of FIG. 2 operates to implement the memory bank selection scheme shown and discussed in FIG. 1 as follows:

Microprocessor 10 operates conventionally with respect to System RAM 12 and System ROM 27. An address supplied on the address bus during Phi 1 (i.e., the first half of the memory cycle (when clock line Phi 1 is active), will enable data to be read into or out of the corresponding address location during Phi 2 (the second half of the memory cycle, when clock line Phi 2 is active). The read/write line is made high to read and low to write. Data information can be written into and read from RAM 12, but only read from ROM 27 (it already contains fixed data). To read the data at any location in ROM 27, the address of such location is supplied on the address bus and the computer supplies a high (read) signal on the read/write line.

For example, to read the byte (eight bits) of data stored in location 62387 of ROM 27, the address bus of Microprocessor 10 would be supplied with the binary code on the sixteen lines thereof for decimal number 62387, i.e., binary 1111001110110011. Since address lines A15 and A13 would be high (logic ONES), input terminals A and B of Decoder II will be active, whereupon output terminal 3 of Decoder II will be active, thereby enabling the D input terminal of ROM 27. This will, as indicated at output terminal 3 of Decoder II, enable address locations 57344 and 65535 of ROM 27. Address 62387, which is within this range, will be selected by lower order address lines which are supplied directly to ROM 27, in conventional fashion. ROM 27 is addressed during the first half of the memory cycle, when clock line Phi 1 is active. Thereafter, in the second half of the cycle, when clock line Phi 2 is active, the data in location 62387 (eight bits) will be supplied by ROM 27 on the data bus to Microprocessor 10 where it will be used in conventional fashion.

Initial bank selection in accordance with the invention is implemented in an operation requiring two separate memory cycles as follows: During the first or selection cycle, the desired bank is selected and latched, and during a later or address cycle, an address is supplied on the address lines to cause the data to be read from or into the address location of the selected bank. For example, assume that, in accordance with the program, a particular address, say location 17425 of capsule 0 in ROM 16, must be read so that the data therein can be used by Microprocessor 10. The reading of the data in this location requires two steps or cycles, as follows:

In the selection cycle, output 0 of Decoder VI is made and held active to select capsule 0. At a later time, when the address cycle occurs, address 17425 is supplied on the address bus in conventional fashion. This address will be effective only at selected ROM capsule 0, whereupon the data in such location of capsule 0 will be read out on the data bus. Once capsule 0 is selected, it will continue to respond to addresses in Range III until it is "deselected".

More particularly, to access ROM capsule 0, the following outputs are supplied by Microprocessor 10 under program control, in the selection cycle:

Address lines A14, A12, A11, and A7 to A1 supply ONES and all the rest of the address lines supply ZEROES, so as to provide the address (22782) (58FE in hexadecimal) of the latch.

The Read/Write line is held low to supply a WRITE signal.

These inputs will cause AND Gate 26 to receive an active signal enabling its input terminal and ONES at all of its logic input terminals, whereupon its output (X) will be active, thereby to strobe latch 28.

During the second half (Phi 2) of the selection cycle, address lines A14, A12, A11, and A7 to A1 continue to supply ONES and the read/write continues to remain in the WRITE state. Data lines D2, D1, and D0 will now supply the binary word 100 to select capsule 0, and the Phi 2 line is of course active. This will cause output terminal 0 of Decoder VI to supply an active signal to capsule 0 of ROM 16. Thus, ROM capsule 0 will be selected.

During the address cycle, the desired address 17425 is supplied by the microprocessor (again under program control) and the read/write line supplies a READ signal. The address will be effective at ROM Capsule 0, whereupon the data in this location of Capsule 0 will be supplied on the data bus.

ROM capsules 1 or 2 can each be selected in similar fashion by writing 101 or 110, respectively, to Latch 28 during the selection cycle.

In order to address the I/O port to select the peripherals and system control hardware in Address Range III (FIG. 1), a similar process is employed. For example, assume that a single peripheral unit, say a printer, is plugged into the computer and the address of one of its ports is 18428. If it is desired to write to this port, no bank selection need be employed since it is not possible to write to a ROM so that any writing automatically must go to I/O ports. Thus, the program should generate the address 18428 and supply the necessary data on the data bus, whereupon the data will automatically proceed to this port.

Specifically, address 18428 is generated by supplying ONES on address lines A14 and A10 to A2 and also supplying a WRITE signal (i.e., a ZERO) on the read-/write line. Address line A14 will supply a ONE to input terminal A of Decoder I, whereupon output terminal 1 thereof will be active, enabling Decoder V. The read-/write line will also supply a ZERO or WRITE input to the A input terminal of Decoder V, and this will cause the output terminal of OR Gate II to go active, enabling input terminal 2 of Decoder IV, regardless of whether input B of Decoder V is high or low. Enabling input terminal 1 of Decoder IV will be made active when the Phi 1 line is low. When output terminal 0 of Decoder IV is active, it supplies a "single peripheral select" signal to memory bank select Latch 32.

The "single peripheral signal" will also become active for any other address from 16384 to 18431. Any address location within this range is selected by the power-ordered address inputs A10 to A0 inclusive. None of the capsules in ROMs 17 or 18 will be selected nor will respond to these addresses, since none of the banks of ROMs 17 or 18 are enabled by any output of Decoder VI.

To read any data stored at this address (18428) in Peripheral 30, it is merely necessary to supply a read signal on the read/write line along with this address on the address lines while supplying ZEROES (from Latch 28) on lines LD2, LD1, LD0. The read/write line will supply a ONE to input terminal A of Decoder V, whereupon output terminal 1 of Decoder V will be active, so that OR Gate II will activate enabling input terminal 2 of Decoder IV. Again, output terminal 0 of Decoder IV will go active in the same manner as before and Peripheral 30 will be selected in similar fashion and the data will be read from the selected location therein.

Even though ROMs 17 and 18 are mapped in the same area as the I/O ports of Peripheral 30, their data will not be read since they were not selected by any output of Decoder VI.

To select any set of up to eight physically-associated banks of external ROM 14, ROM 18, or RAM 22, a respective decoder for each such set of eight banks is provided in every peripheral. The data line numbered the same as the bank to be selected is made high, as will be described in connection with FIG. 4, infra. The selection of higher-numbered banks in these external memories is also described infra in connection with FIG. 4.

FIG. 3—ROM CHIP WITH POWER-ON SELECT

Figure 3:
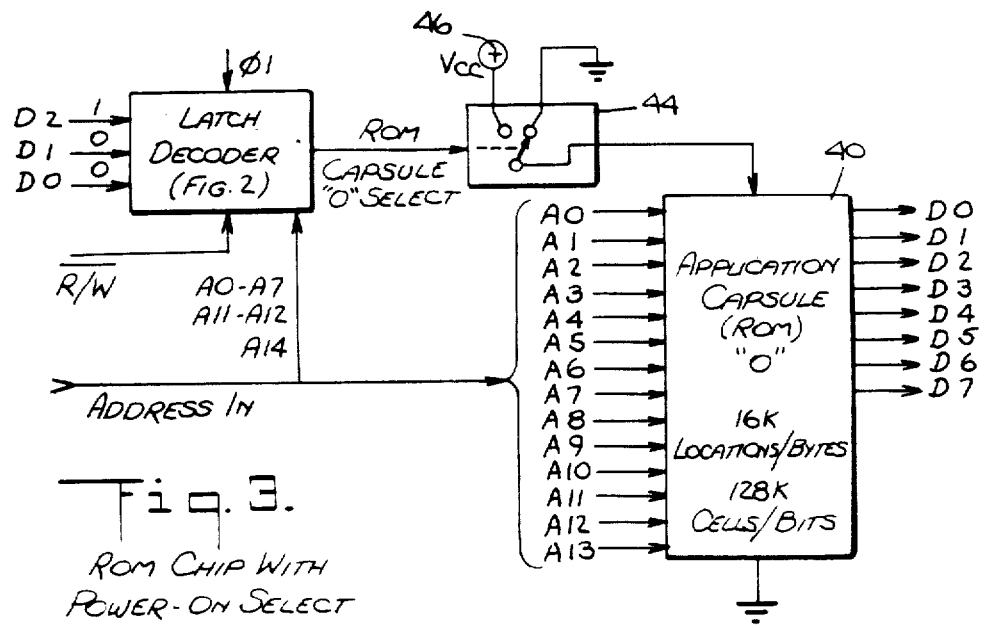
FIG. 3 is a diagram of a ROM chip in accordance with the invention.

As stated, ROM capsule 0 of FIG. 2 is preferably formed in monolithic integrated circuit form and is selected in the manner indicated in FIG. 3. The integrated circuit or chip constituting ROM capsule 0 is shown at 40. Chip 40 has fourteen address inputs, A0 to A13, eight data outputs, D0 to D7, and two bias source connections, ground and Vcc, as indicated. ROM 40 has 16k locations (k=1024) and hence can store 16k eight-bit bytes. It thus has 16k×8=128k binary cells which can store 128k bits. Any of the 16k bytes in ROM 40 will be read out on its data lines if the binary address of the byte's location is supplied and if ROM 40 is selected by supplying an appropriate voltage, usually 5 volts, at its Vcc terminal with respect to its ground terminal.

The Vcc terminal of ROM 0 is energized by the latch and decoder system of FIG. 2, which causes the "ROM capsule 0 select" line at the 0 output of Decoder VI to go active in the manner aforedescribed. This causes a single-pole double-throw Electronic Switch 44—preferably a combination PNP and NPN transistor circuit which normally connects the Vcc terminal of ROM 40 to ground as indicated—to connect the Vcc terminal to a positive Vcc Source 46, thereby simultaneously to energize and select the ROM chip.

Since the ROM chip is not connected to any bias source when it is not selected, it does not consume standby power, thereby making the computer more energy efficient and highly suitable for portable, battery-powered operations. Since a separate chip select terminal is not required, one more address line may be used. Therefore, a 16k byte ROM can be provided in a twenty-four (rather than twenty-eight) pin package. This allows compatability with other ROMs (1k, 2k, 4k and 8k bytes) packaged for use in the computer's sockets.

All of the ROM banks in the system of FIG. 2 are preferably enabled in this fashion: (RAMS cannot be enabled by a power-on select circuit since RAMs are volatile, i.e. if they are not constantly energized, the information stored therein will be lost.)

FIG. 4—RAM BANK SELECTION

Figure 4:
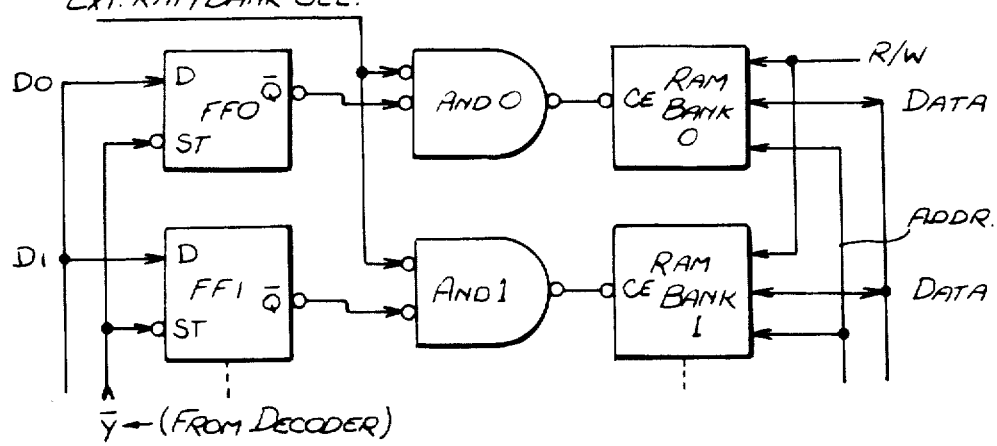
FIG. 4 is a diagram of RAM bank selection circuitry in accordance with the invention.

The system of FIG. 4 shows a multi-bit latch which is one of bank select Latches 24 which can select any one of a set of up to eight RAM banks housed in one RAM peripheral. As stated, Latches 16 of control ROM 14 and Latches 20 of ROM 18 are similar to Latches 24.

The circuit of FIG. 4 receives the external RAM bank select signal from output 2 of Decoder I. This signal is supplied in parallel to the upper input terminal of each of a plurality of AND gates 0, 1, etc., one for each RAM bank. The other, lower input terminals to the AND gates come from a multi-bit latch consisting of a plurality of correspondingly-numbered data flip-flops; the inverted output of each flip-flop is connected to the lower input terminal of its correspondingly-numbered AND gate. Thus the lower input terminal of AND Gate 0 is connected to the output terminal of Flip-flop 0, the lower input of And Gate 1 is connected to the output terminal of Flip-flop 1, etc.

The output terminal of each AND gate is connected to a chip enable terminal of a corresponding RAM bank. Thus, the output of AND Gate 0 is connected to the chip enable input of RAM Bank 0, the output of AND Gate 1 is connected to the chip enable input of RAM Bank 1, etc. Also, each RAM bank receives a read/write signal, and is also connected to the data bus and the address bus, as indicated. (Each RAM bank may comprise a plurality of separate RAM chips, each of which is mapped in its own address range and which is selected in well-known fashion.)

Each data flip-flop of the multi-bit latch has a D (data) input which is connected to the correspondingly-numbered one of the data lines. Thus the input of Flip-flop 0 is connected to D0 (line 0 of the data bus), etc.

The strobe (ST) or clock input terminal of each flip-flop is supplied with a decoder output signal, Y-bar, similar to the X signal at the output of AND Gate 26 of FIG. 2. This signal is generated by the local address decoder when Microprocessor 10 is writing to this latch, which is regarded as an output port.

Assume for example that it is desired to supply data to or read data from a particular address in RAM Bank 1. Only input D1 to the latch circuit of FIG. 4 is made high in the select cycle in order to select RAM Bank 1; all the rest of the data lines will be held low. The Y-bar signal will reset all of the flip-flops of FIG. 4 except for Flip-flop 1. The high input on the D1 line will set Flip-flop 1 so that its output (Q-bar) will supply an active (low) input to the lower terminal of AND Gate 1, thus selecting this RAM bank.

In the address cycle, which can either be a read or a write, the address bus supplies the address of any location in RAM Bank 1, causing the external RAM bank select to the top input terminal of the AND gate to go active (low). Appropriate data can then be stored into or read from such location of RAM Bank 1 in conventional fashion.

Using this method, any of the eight banks in one peripheral can be selected and accessed.

Any of the other banks of any of Memories 14, 18, or 22 can also be selected in similar fashion, except that, again, a separate decoder, similar to that of FIG. 2, but with a different address, would be provided to enable each subsequent set of eight banks with their own enabling signal. Thus, a "Z" signal would be provided for the ninth to sixteenth banks, etc.

While the above description contains many specificities, these should not be considered as limitations upon the scope of the invention since many other embodiments and ramifications are possible. For example, the memory map of FIG. 1 can be rearranged in various ways, different logic components can be used in FIG. 2 in lieu of those shown, different components can be supplied within the computer housing and outside thereof than those indicated, different arrangements of the peripheral equipment can be used, etc. Accordingly, the scope of the invention should be determined only by the appended claims and their legal equivalents.

We claim:

1. A computer with an expanded addressing capability comprising:

processor means having an address bus with a plurality of address lines for generating and supplying addresses through said address bus;

a plurality of addressable banks which are divided into a plurality of distinct address ranges, one of said address ranges including a plurality of read-only memory banks, each of which bank being implemented in the form of at least one monolithic integrated circuit having first and second bias supply terminals, said first bias supply terminal being designed to be connected to a reference potential and said second bias supply terminal being designed to be connected to a biasing potential, said plurality of addressable banks comprising a first plurality of read-only memory banks within one of said address ranges for storing respective programs to control respective items of peripheral equipment operatively associated with said computer, a second plurality of read-only memory banks within a second of said address ranges for storing respective programs and/or data for respective applications which can be performed by said computer, and a plurality of read-and-write memory banks within another of said address ranges for storing variable information for use by said computer, said second of said address ranges, in addition to a plurality of read-only memory banks, also having an addressable hardware bank comprising at least one item of peripheral equipment which is controlled by one of said read-only memory banks of said one of address ranges; and banks preselection means for preselecting any bank of any address range such that if any address is supplied on said address bus of said processor means, it will be effective only at the preselected bank and all other non-preselected banks will be inactive and not addressed by said processor means, said bank preselection means being arranged to cause said second bias supply terminal to be connected to said biasing potential when said bank is selected and to be connected to said reference when said bank is not selected.

* * * * *